Dec. 23, 1952      R. J. HOWISON      2,622,418
FLEXIBLE SPROCKET HUB
Filed May 21, 1949
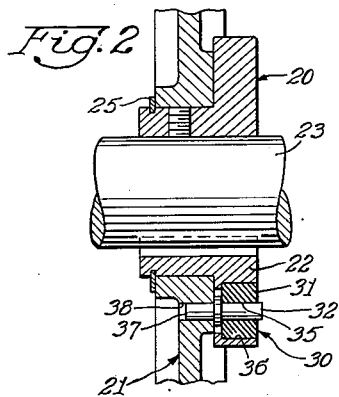
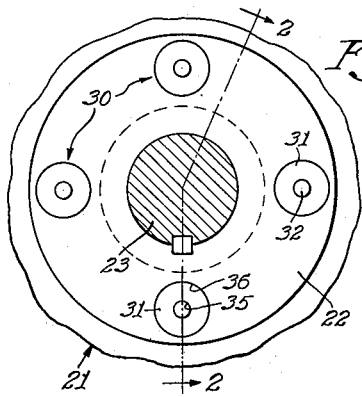
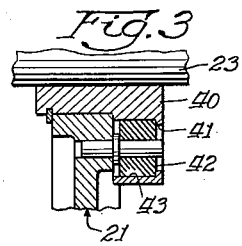
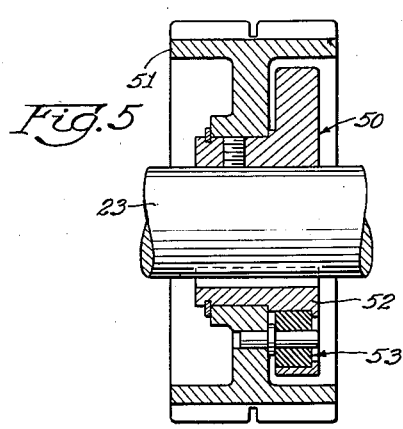
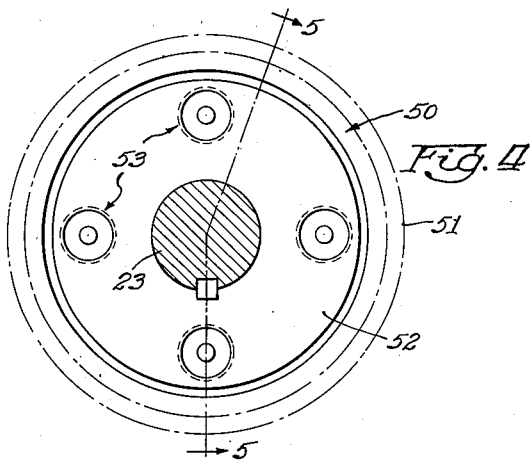
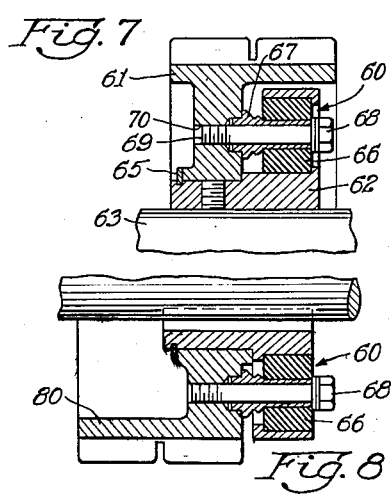
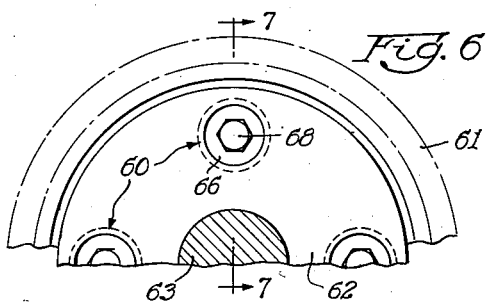
Inventor:
Robert J. Howison Patented Dec. 23, 1952

2,622,418

UNITED STATES PATENT OFFICE 2,622,418

FLEXIBLE SPROCKET HUB

Robert J. Howison, Detroit, Mich., assignor to Morse Chain Company, Ithaca, N. Y., a corporation of New York Application May 21, 1949, Serial No. 94,585

1 Claim. (Cl. 64—27)

This invention relates in general to sprockets for power transmission driving means and is particularly concerned with a flexible sprocket hub construction providing a means of connecting the sprocket to a shaft through a flexible medium particularly characterized as being of the parallel spring type.

A flexible sprocket hub construction incorporating a flexible medium as contemplated by this invention is particularly advantageous because it reduces the magnitude of shock load transmitted from the driving to the driven members. In accordance with the construction of the present invention the drive is so constructed that the flexibility of the connecting flexible medium can be controlled by the respective arrangement and the number of the flexible trunnion blocks incorporated in the device so as to tune the natural frequency of the system out of the range of the frequency of exciting torque.

It is recognized that in the prior art numerous attempts have been made to provide a flexible sprocket hub of this general class and efforts have been made to overcome the various deficiencies found in such prior art structures, but to the best of the applicant's knowledge the prior art structures have had only limited success, and have been accorded only limited commercial recognition. It is believed that this fact results from apparent deficiencies of the prior art structures, their nonadaptability for universal application and their expensive construction which so greatly increased the cost as to seriously handicap sales acceptance.

The present improvement in flexible sprocket hubs is directed to simplify their construction and their mode of operation and also to provide a flexible sprocket hub which may readily and conveniently be employed universally to various types of sprocket assemblies presently being commercially exploited. Moreover, the present device seeks to employ conventional parts wherever necessary and possible, thereby to effect a substantial reduction in cost over the prevailing types of flexible sprocket hub assemblies presently being employed.

Accordingly, an object and accomplishment of the invention is to provide a flexible sprocket hub assembly comprising a sprocket and flange hub, the sprocket being arranged for a free fit on the flange hub and being maintained endwise by suitable means such as, for example, a snap ring. In the flange of the hub a number of trunnion blocks are incorporated, with a like number of driving pins in the sprocket, all in a parallel spring system, the load on the sprocket being taken through the pins by the trunnion block to the driven shaft via the hub flange.

An important object and accomplishment of the invention is to provide a flexible sprocket hub incorporating a flexible medium, said flexible sprocket hub being particularly and advantageously applicable for employment in power transmission equipment where freedom from vibration and shock is desired, said flexible sprocket hub being particularly characterized in its simple but sturdy construction and in its convenient, fool proof and safe operation.

Another particular object and accomplishment of the invention is to provide a flexible sprocket hub incorporating a flexible medium by co-relating and especially designing the various elements of such flexible sprocket hub assembly whereby there shall be such cooperation between said improved elements as will best serve the purpose of providing an efficient flexible sprocket hub assembly capable of being manufactured at low cost and yet giving the maximum of satisfactory service in use.

A further object and accomplishment of the invention is to provide a flexible sprocket hub assembly designed for advantageous employment in power transmission equipment and which shall have a novel and compact arrangement of parts wherein said parts can be readily assembled and serviced.

A more detailed object and accomplishment of the invention is to provide a flexible sprocket hub assembly incorporating a flexible medium employing principles of construction and operation whereby the flexible medium imparts a parallel spring system as distinguished from a series spring system. It is notable that in parallel spring systems of the type as contemplated herein the deflections of the trunnions members are not additive. This type of system gives less flexibility than the series type system but provides more load carrying capacity which may be highly desirable in many applications.

The invention seeks, as a further object and accomplishment, to provide a flexible sprocket hub as contemplated herein and characterized by an arrangement of parts to more advantageously and satisfactorily perform the function required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and, as more particularly pointed out in the appended claim.

With the above and other incidental objects in view, the invention has other marked improvements and superiorities which radically distinguishes it from presently known structures, these improvements in the invention residing in the novel construction and cooperative function of the parts thereof, the combination of parts and the arrangement thereof as illustrated in the drawing and which will be more fully described hereinafter and particularly pointed out in the claim.

In the accompanying drawing on which there is shown preferred embodiments of the invention, Fig. 1 is a side elevational view of a flexible sprocket hub embodying the features of the present invention;

Fig. 2 is a sectional view of the flexible sprocket hub assembly depicted in Fig. 1 and being taken substantially on the plane of the line 2—2 in Fig. 1;

Fig. 3 is a fragmentary sectional view of a portion of a flexible hub assembly showing a modified hub but employing a trunnion assembly as depicted in Fig. 2;

Fig. 4 is a side elevational view of a sprocket hub assembly of a type similar to that disclosed with respect to Fig. 2 but showing a different type of sprocket with which the flexible medium of the present invention may be employed;

Fig. 5 is a sectional elevational view of a flexible sprocket assembly depicted in Fig. 4 and being taken substantially on the plane of the line 5—5 in Fig. 4;

Fig. 6 shows a modified form of flexible sprocket assembly contemplated herein;

Fig. 7 is a fragmentary sectional elevational view of the flexible sprocket hub depicted in Fig. 6 and being taken substantially on the plane of the line 7—7 in Fig. 6; and Fig. 8 is a fragmentary sectional elevational view illustrating a different type of sprocket which may be employed with the flexible trunnion assembly depicted in the sprocket assembly illustrated in Fig. 7.

The drawing is to be understood as being more or less of a schematic character for the purpose of illustrating and disclosing typical or preferred forms of the improvements contemplated herein and in the drawing like reference characters identify the same parts in the several views.

In the exemplary embodiment of the invention depicted in Figs. 1 and 2, the flexible sprocket hub with which the present invention is particularly concerned is designated in its entirety by the numeral 20 and comprises, in general, a sprocket element 21, in this instance constituting the driving member, a flanged hub 22 carried by a shaft 23, in this instance constituting the driven member, said sprocket element being arranged for a free fit on the flanged hub to permit restricted relative rotation therebetween and being maintained end-wise by suitable means such as, for example, a snap ring 25, said sprocket element 21 and said flanged hub 22 having operatively disposed therebetween a flexible medium designated in its entirety by the numeral 30 and comprising a plurality of trunnion blocks as at 31 operatively associated with portions of the flanged hub, and a plurality of driving pins as at 32 having end portions thereof operatively associated with the sprocket element 21 and the opposite ends thereof being operatively associated with the trunnions blocks 31, thereby to reduce the magnitude of shock loads transmitted from the driving to the driven member, the arrangement being particularly characterized in its mode of operation in that the flexibility of the flexible medium 30 can be controlled by the arrangement and number of the trunnion blocks as at 31 so as to tune the natural frequency of the system out of the range of the frequencies of the exciting torque.

It is notable that the path of the load on the sprocket is arranged so that it is taken through the pins 32 by the trunnion blocks 31 and thereafter transmitted to the driven shaft 23 via the hub flange 22. This arrangement provides torsional deflection or wrap-up of the sprocket 21 in relation to the shaft 23. The desired results can also be attained by altering the number and size of trunnion blocks or the radius on which they are mounted.

In accordance with the construction of the present invention the flexible medium 30 provides a parallel spring system as distinguished from a series spring system. In this connection, in parallel spring systems of the type as contemplated herein the deflections of the trunnion members 31 of the flexible medium 30 are not additive. This type of system gives less flexibility than the series type system but provides more load carrying capacity which may be highly desirable in many applications.

Having thus described in general the major component parts of the flexible sprocket hub contemplated herein, the specific construction and cooperative association and function of the parts of said flexible sprocket hub will now be described in detail.

Although the description thus far has stated that the sprocket element 21 constitutes the driving element while the shaft 23 constitutes the driven element, it is obvious that the function of these elements may be reversed in some instances so that the shaft 23 may be the driving element while the sprocket element 21 will then become the driving member.

An important feature of this invention is the provision of the flexible medium 30 as being mechanically operatively disposed between the sprocket element 21 and the flanged hub 22 to provide a resilient connection between these elements. The flexible medium 30 is comprised of preloaded trunnion blocks as at 31 which may be formed of a suitable rubber and whose live muscle-like flexibility take up the wrap-up of torsional loads, thereby to protect machine installations to which the present flexible sprocket hub assembly may be adjunctively employed from shock, vibration and uneven impulses. Moreover, the employment of flexible trunnion blocks as contemplated herein advantageously limits metal-to-metal contact between the driving and driven members and requires no lubrication, is impervious to dirt, dust and weather.

The muscle-like trunnion blocks as at 31 are designed for uniform stress and linear deflection, all relative movement being accommodated by controlled displacement of the compressed rubber. It is notable that the bore 35 of the trunnion block 31 is of smaller diameter than the diameter of the pin 32 thereby providing a heavy press fit between these elements when they are assembled.

Moreover, individual trunnion blocks as at 31 are press fitted into a pocket 36 disposed in the flanged hub 22 while the end portions 37 of the pins 32 are received into an aperture 38 disposed in the sprocket element 21. A snug fit is provided for the end portions of the pin 37 in the aperture 38. Therefore, when the flexible medium 30 is in its assembled relationship as illustrated in Fig. 2, the trunnion blocks 31 are arranged for uniform stress and annular deflection, all relative movement being accommodated by controlled displacement of the compressed rubber. Preloading of the trunnion blocks 31 in assembly permits them to allow considerable deflection even with a light load.

The design and preloading of the trunnion blocks provide advantageous operation in displacement resulting from thrust loads and accommodates annular deflection and torsional vibration, torsional deflection being overcome by the fact that imposition of a torque load increases pressure in the direction of the load and reduces pressure in the opposite direction. Because of the initial preloaded condition, the trunnion blocks are still under compression throughout their volume even at a maximum torque load.

Adverting to Fig. 3 wherein there is illustrated a sectional view of a portion of the flexible sprocket hub assembly depicted in Fig. 2 but showing a modified hub 40 employing a trunnion assembly as hereinbefore described and depicted in Fig. 2. The only difference in construction between the hub 22 and the hub 40 is the provision of an annular flange 41 arranged to retain the trunnion block 42 in its operative position in the pocket 43 forming a part of the hub 40.

In Figs. 4 and 5 there is disclosed a flexible sprocket hub assembly designated in its entirety by the numeral 50 and employing principles of operation and construction as that of the construction depicted in Figs. 2 and 3. A review of the drawing will disclose that a different type of sprocket 51 is employed while the particular type of hub 52 is similar in construction to the hub 40 depicted in Fig. 3. The flexible medium, designated in its entirety by the numeral 53 is exactly the same as hereinbefore described with respect to the construction disclosed in Figs. 1, 2 and 3.

Attention is invited to Figs. 6 and 7 which disclose a modified flexible medium designated in its entirety by the numeral 60. The principles of operation are the same as that depicted with respect to the construction disclosed in Figs. 1 and 2, but in some applications it may be desirable to employ a stud bolt construction as disclosed in Fig. 7.

In Fig. 7 the flexible sprocket hub assembly comprises, in general, a sprocket element 61, a flanged hub 62 carried by a shaft 63, said sprocket element being arranged for a free fit on the flanged hub 62 to permit restricted relative rotation therebetween and being maintained endwise by suitable means such as, for example, a snap ring 65, said sprocket element 61 and said flanged hub 62 having operatively disposed therebetween the flexible medium 60 which comprises a plurality of trunnion blocks 66 operatively associated with portions of the flanged hub and mounted by a press fit on a bushing 67 which is arranged to receive a stud bolt 68 having threaded end portions 69 arranged to be received into a threaded aperture 70, thereby to maintain the relative parts of the flexible medium in their operative position. Thus it can be seen that the path of the load on the sprocket is arranged so that it is taken through the stud bolt 68 by the trunnion blocks 66 and thereafter transmitted to the shaft 63 via the hub 62.

Adverting to Fig. 8 it can be seen that the same general construction as disclosed in Fig. 7 is employed but that a different type of sprocket as at 80 is employed.

In operation, it is notable that the sprocket 21 may be removed from the hub assembly 22 by merely removing the snap ring 25 which will permit the sprocket 21 to be moved axially to the left as illustrated. When it is desired to move the sprocket 61 from the hub 62 the snap ring 65 is removed and each of the study bolts 68 are removed. This will permit the sprocket 61 to be moved axially to the left as disclosed in Fig. 7.

In this connection it may be stated that various sizes of sprockets may be employed on the same hub structure. Replacement of a selected sprocket may be accomplished in the manner as hereinbefore described. This feature is particularly advantageous where it is desired to employ different sized sprockets to accomplish different drive arrangements.

From the foregoing disclosures, it may be observed that I have provided an improved flexible sprocket hub assembly which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of a flexible sprocket hub being particularly and advantageously applicable for employment in power transmission equipment where freedom from vibration and shock is desired.

While I have illustrated preferred embodiments of my invention, many modifications may be made without departing from the spirit of the invention, and I do not wish to be limited to the precise details of construction set forth, but wish to avail myself of all changes within the scope of the appended claim.

I claim:

Power transmission means comprising a sprocket and a hub, said sprocket being arranged concentrically for a free fit on said hub and capable of limited relative rotation therewith but substantially incapable of relative axial movement during operation, said hub having means to maintain the sprocket in its operative position respective to the hub and removable from its operative position respective to the hub to permit removal of the sprocket from the hub, said means comprising a shoulder on the hub and a snap ring axially spaced therefrom and the sprocket being freely mounted on the hub thereby, said hub further having a plurality of pockets therein, said pockets having peripheral flanges thereon, and an arrangement of flexible means for resiliently connecting said sprocket and said hub during driving relationship comprising a plurality of equally, radially and circumferentially spaced, substantially cylindrical elastic trunnion blocks of rubber-like material press-fitted in said pockets, and a plurality of driving pins all of which have end portions thereof directly secured to said sprocket and end portions embedded in said blocks, said pins characterizing a resilient association with said hub whereby the load of said sprocket is resiliently transmitted to said hub without any substantial direct contact by said pins with said hub, thereby to reduce the magnitude of the shock loads transmitted from the sprocket to the hub.

ROBERT J. HOWISON.

REFERENCES CITED

The following references are of record in the file of this patent:

UNITED STATES PATENTS

| Number | Name | Date |
|---|---|---|
| 1,396,979 | Thomas | Nov. 15, 1921 |
| 1,815,894 | Baker | July 28, 1931 |
| 1,861,390 | Gunn | May 31, 1932 |
| 2,038,020 | Wylie | Apr. 21, 1936 |